United States Patent [19]
Kakida et al.

[11] Patent Number: 5,242,045
[45] Date of Patent: Sep. 7, 1993

[54] CONVEYING SYSTEM

[75] Inventors: Takuya Kakida, Kurashiki; Shigeki Tanaka, Asakuchi, both of Japan

[73] Assignee: Mitsubishi Judosha Kogyo Kabushiki Kaisha, Tokyo, Japan

[21] Appl. No.: 957,907

[22] Filed: Oct. 8, 1992

[30] Foreign Application Priority Data

Oct. 8, 1991 [JP] Japan ............................ 3-081637[U]

[51] Int. Cl.⁵ ............................................. B65G 43/08
[52] U.S. Cl. .............................. 198/468.6; 198/464.3; 198/468.8
[58] Field of Search ................ 198/464.1, 464.2, 464.3, 198/465.1, 468.6, 468.8, 678.1

[56] References Cited

U.S. PATENT DOCUMENTS

| | | | |
|---|---|---|---|
| 2,506,425 | 5/1950 | Journeaux | 198/468.8 X |
| 3,082,495 | 3/1963 | Miller, Jr. | 198/464.3 |
| 3,530,970 | 9/1970 | Richardson et al. | 198/468.8 |
| 3,737,019 | 6/1973 | Coleman et al. | 198/468.8 X |
| 3,799,317 | 3/1974 | Shibata et al. | 198/464.3 X |
| 4,770,590 | 9/1988 | Hugues et al. | 198/464.3 X |
| 5,073,081 | 12/1991 | Johnson | 198/468.8 X |

Primary Examiner—Robert P. Olszewski
Assistant Examiner—James R. Bidwell

[57] ABSTRACT

The conveying system is incorporated in automobile assembly line, and comprises an overhead conveyer, a shuttle conveyer, a lift for carrying a work from the overhead conveyer to the shuttle conveyer, a lift controller and a shuttle controller. The shuttle conveyer carries the work from the lift to its destination. The lift controller controls the operation of the lift, which is reciprocated vertically according to the position of a shuttle member of the shutter conveyer. The shuttle controller controls the operation of the shuttle conveyer depending upon the position of a movable work holding base of the lift. A plurality of detectors are provided so as to detect the positions of the movable work holding base of the lift and the shuttle member of the shuttle conveyer, so that the conveying system can reliably operate without the interference between the lift and the shuttle conveyer.

4 Claims, 6 Drawing Sheets

CONVEYING SYSTEM

BACKGROUND OF THE INVENTION

1. Field of the Invention

This invention relates to a conveying system for carrying works by means of a series of conveyers, and more particularly to a work conveying system including a lift, which is located between overhead conveyers and a ground-based conveyers so as to receive works from the overhead conveyers and to deliver them to the ground-based conveyers without interfering with the latter conveyers, thereby reliably and intermittently carrying the works from one processing stations to other processing stations in an automobile assembly line.

2. Description of the Related Art

A variety of processing devices are installed in an automobile assembly line having a limited available space where various works such as body panels are assembled to form an automobile. In such a case, the works are usually conveyed by conveyers such as overhead and ground-based conveyers according to body assembling procedures.

Lifts are usually used to bring the works between the conveyers which are installed at different heights in the automobile body assembly line. In this case, the conveyers are required to operate harmoniously with a timed relationship. The conveyers are controlled by their control units in response to status indicating signals from their cooperating conveyers. For example, work carrying members of two adjacent conveyers are controlled not to reach a work delivery area simultaneously. For this purpose, an interlock device is incorporated in the control units so as to prevent interference between the work carrying members of the two conveyers at the work delivery area.

Figure 6:
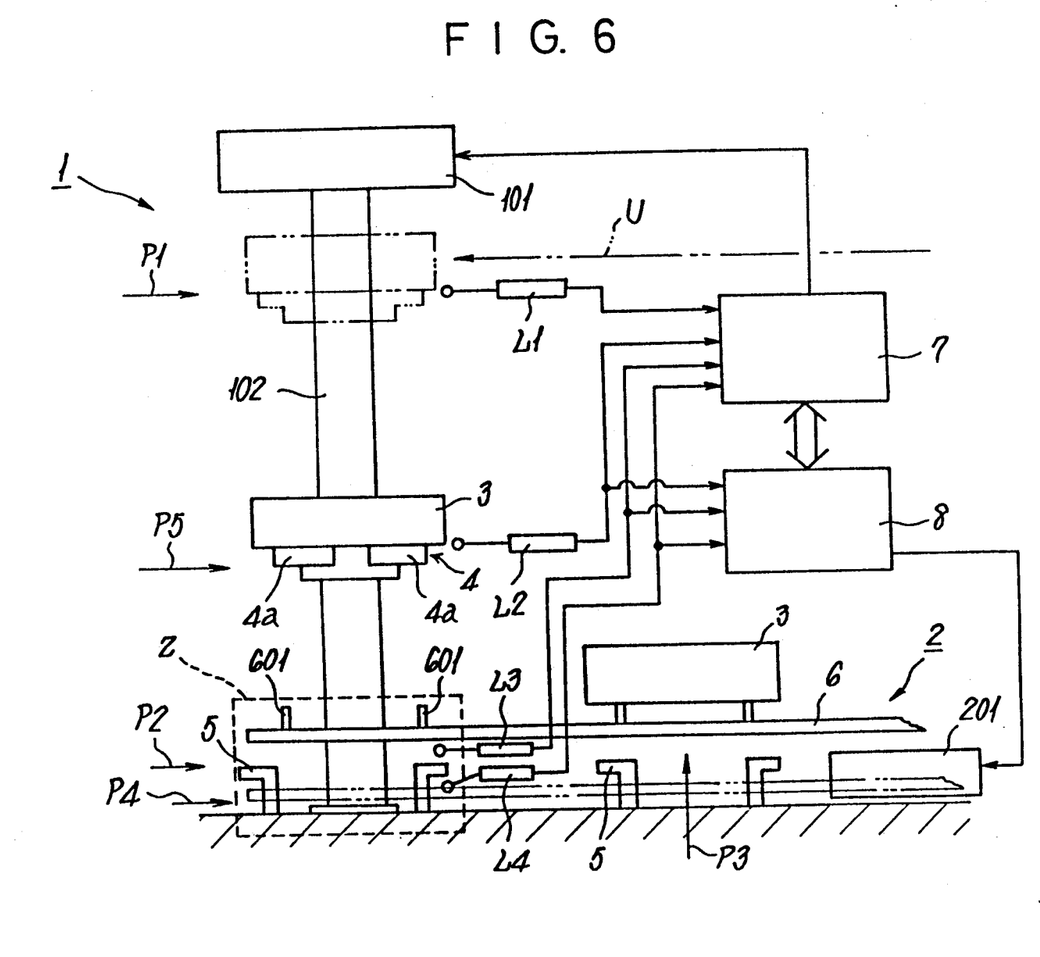
FIG. 6 is a schematic view of a conveyer system of the prior art.

FIG. 6 of the accompanying drawings shows an example of the foregoing work conveying system. With this system an overhead conveyer is installed on a ceiling of a factory building. A work 3 carried along a route U (not shown) is delivered to a ground-based shuttle conveyer 2 via a lift 1.

The lift 1 is includes a support 102 one end of which is fixedly secured on a floor of the factory building and the other end of which stands upright, a movable base 4 which reciprocates between an upper first delivery position P1 and a lower second delivery position P2, and a lift driver 101 which is positioned atop the support 102 and is connected to the movable base 4 so as to reciprocate the movable base 4 vertically. The movable base 4 has a retractile fork 4a for receiving the work 3 which reaches the first delivery P1 along the route U. The fork 4a projects horizontally from the movable base 4 so as carry the work thereon. On the contrary, when the fork 4a is idle, it is retracted into the movable base 4 so as not to interfere with the shuttle conveyer 2. The lift 1 is controlled by a lift controller which is electrically connected to the lift driver 101.

The shuttle conveyer 2 is installed on the floor at a position under the overhead conveying route U. The shuttle conveyer 2 carries works 3 on its shuttle member 6 to work stations.

The shuttle member 6 is moved up by a drive mechanism (not shown), receives the work 3 placed on a jig 5, and carries the work 3 to the succeeding processing station while it remains upward. At the destination, the shuttle member 6 goes down, and places the work 3 on another jig 5. Then, the shuttle member 6 keeps its lower posture, returns to its original position on a standby level P4, and stops there. The shuttle member 6 repeats the foregoing operation. The shuttle member 6 is driven by a shuttle driver 201, of which operation is controlled by a shuttle controller 8 according to the operation cycle of respective work stations. The operation cycle is determined based on the time required at respective work stations. The jigs 5 the at respective work stations are located outside a moving path of the shuttle member 6 so as not to interfere with the shuttle member 6.

Near the second delivery position P2, there is a zone Z where the moving path of the movable base 4 of the lift 1 overlaps the moving path of the shuttle member 6 of the shuttle conveyer 2. This zone Z is called the overlapping zone Z hereinafter. The work conveying system includes an interlocking device for preventing the interference between the movable base 4 and the shuttle member 6.

The interlocking device has two limit switches L1 and L2 attached on the support 102, for example. The limit switch L1 turns on when the movable base 4 is at the second delivery position P1, and sends a signal to the lift controller 7. The limit switch L2 is turned on or off when the movable base 4 passes through a waiting position P5 where the movable base 4 does not interfere with the shuttle member 6. The waiting position P5 is at the center of the moving path of the movable base 4. Specifically, the limit switch L2 is located near the waiting position P5, and is turned on when the movable base 4 moves up from the second delivery position P2 and passes the waiting position P5. On the other hand, the limit switch L2 is turned off when the movable base 4 moves down from the first delivery position P1 and passes the waiting position P5. In other words, the limit switch L2 remains on while the movable base 4 stays above the waiting position P5, so that a signal is provided to the lift controller 7 and a shuttle controller 8 (to be described later) to indicate the position of the movable base 4. When the movable base 4 is below the waiting position P5, the limit switch L2 is turned off to send a signal to the lift controller 7.

Furthermore, the shuttle conveyer 2 includes limit switches L3 and L4 for detecting the position of the shuttle member 6 in the overlapping zone Z, and the presence or absence of the work in the overlapping zone Z. The switches L3 and L4 are positioned near the jig 5.

The limit switch 3 is turned on when the work 3 is placed on the jig 5 at the second delivery position P2, and sends a signal to the shuttle controller 8 and the lift controller 7 so as to indicate the situation. The limit switch L4 is turned on by the shuttle member 6 which is on the standby level P4, and is turned off when the shuttle member 6 leaves the standby level P4, so that the switch L4 sends a signal to the shuttle controller 8 and the lift controller 7 to indicate the situation.

When the movable base 4 receives a work 3 at the first delivery position P1, the lift controller 7 descends the movable base 4 so long as a preceding work 3 is not at the second delivery position P2 according to the limit switch L3, and the shuttle member 6 is on the standby level P4 according to the limit switch L4. The movable base 4 is moved down to bring the work 3 to the second delivery position P2 via the waiting position P5. On the contrary, the lift controller 7 controls to stop the movable base 4 at the waiting position P5, when the lift controller 7 receives signals from the limit switches L3 and L4 indicating that the work 3 is at the second delivery position P2 or that the shuttle member 6 has is not on the standby level P4, respectively.

On receiving a signal from the limit switch L2 indicating that the movable base 4 is above the waiting position P5, the shuttle controller 8 ascends the shuttle member 6 from the standby level P4 to the second delivery position P2, where the shuttle member 6 receives the work 3. Then, the shuttle member 6 is moved to a third delivery position P3.

When receiving a signal from the limit switch L2 indicating that the movable base 4 has reached the waiting position P5, the shuttle controller 8 moves the movable base 4 down to the second delivery position P2, where the work 3 is placed on the jig 5. Then, the movable base 4 is ascended with the fork 4a retracted. Then, the shuttle member 6 is controlled not to be actuated until the movable base 4 is moved up above the waiting position P5.

The foregoing operation keeps the lift 1 and the shuttle conveyer 2 from interfering with each other in the overlapping zone Z.

The operation of the shuttle conveyer 2 is controlled according to the operation cycles of the processing machines on the assembly line. In other words, the start time and cycle time of the shuttle conveyer 2 depend upon the machines which process the works 3. Therefore, even when there is no work 3 at the second delivery position P2, the shuttle conveyer 2 has to move up from the standby level P4 and start the cycle to convey works 3 to succeeding processes. Therefore, the shuttle conveyer 2 is sometimes idle at the second delivery position P2. The following inconveniences will be caused under such a condition.

Assume that the limit switch L3 signals that the work 3 is at the second delivery position P2, and that the limit switch L2 signals that the movable base 4 is above the waiting position P5. Under this condition, no trouble will be caused when the shuttle member 6 begins to ascend from the standby level P4.

On the contrary, assume that when the shuttle conveyer 2 is driven even if no work 3 is present at the second delivery position P2, i.e. when the limit switch L3 signals that no work 3 is at the second delivery position P2 and when the limit switch L2 signals that the movable base 4 is above the waiting position P5. And assume that the shuttle conveyer 2 is actuated under this condition according to its operating cycle. When the movable base 4 moves downwardly from the first delivery position P1 and is at just before the waiting position P5, it receives the signal indicating that no work 3 is at the second delivery position P2. Under this condition, since the limit switch L4 signals that the shuttle member 6 is on the standby level P4 at the moment or immediately after the shuttle member 6 starts its upward movement from the standby level P4, the interlocking device will not function, so that the movable base 4 keeps on moving down via the waiting position P5.

Then, the movable base 4 is stopped by the interlocking device above the waiting position P5 in response to the signal from the limit switch L4 indicating that the shuttle member 6 is not on the standby level P4.

On the other hand, the moving shuttle member 6 is also stopped in response to the signal from the limit switch L2 indicating that the movable base 4 moves down to a position below the waiting position P5.

The conventional conveying system suffers from the foregoing inconvenience that the lift 1 and the shuttle conveyer 2 are unintentionally stopped by the interlocking device according to their operation timings, so that the work 3 cannot be delivered as desired.

SUMMARY OF THE INVENTION

It is an object of the prevent invention to provide a conveying system which can prevent the interference between a lift and a shuttle conveyer, and which can appropriately interlock the lift and the shuttle conveyer when they are operating on their own operating timings.

According to the invention, there is provided a conveying system which comprises: an upper conveyer for conveying works; a lift for bringing the works down from the upper conveyer and including a movable base and a lift driver; a lower conveyer for conveying the works and including a shuttle member and a shuttle driver; a plurality of jigs for supporting the works and juxtaposed along the lower conveyer; a first detecting means for detecting the presence of the movable base at a position to receive the works from the upper conveyer; a second detecting means for detecting whether or not the movable base is above a waiting position; a third detecting means for detecting whether or not the movable base is above a slowdown point; a work detecting means for detecting the presence of works on the jigs; a standby level detecting means for detecting the presence of the shuttle member at an original position on a standby level; a lift controller for providing the lift driver with a control signal to vertically reciprocate the movable base; and a shuttle controller for providing a control signal to the shuttle driver so as to operate the shuttle member repeatedly according to its operation cycle.

The shuttle member is vertically reciprocated between an upper level and a lower level in which the shuttle member lifts the work from the jigs and then places the work onto the jigs, respectively, and is also laterally reciprocative in a preset stroke from its original position.

The shuttle driver reciprocates the shuttle member vertically and laterally according to the operation cycle of the shuttle member.

The lift controller provides the lift driver with a control signal to ascend the movable base in response to a signal from the first detecting means indicating that the movable base is not at an upper first delivery position, and for sending the lift driver a signal to brake and stop the movable base in response to a signal indicating that said shuttle member is not on the standby level when the movable base is moving downwardly from an upper position via the slowdown point and the waiting position.

The shuttle controller operates the shuttle member repeatedly at each conveying cycle, and initiating the conveying cycle of the shuttle member by providing the shuttle driver with a signal for allowing the upward movement of the shuttle member only in response to a signal from the work detecting means indicating that no works are placed on the jigs, in response to a signal from the second detecting means indicating that the movable base is above the waiting position, and in response to a signal from the third detecting means indicating that the movable base is above the slowdown point.

With the foregoing arrangement, the work conveyed by the upper conveyer is transferred to the movable base of the lift, and is then brought down to the jig at the lower delivery position. The work on the jig is carried by the shuttle member of the shuttle conveyer to a next processing station, where the work is placed on another jig.

Interlocking control is executed when the movable base moves down passing through the slowdown point before the shuttle member is not at the original position on the standby level is, so that the movable base is caused to be stopped by the lift controller.

On the other hand, the interlocking control is applied to the shuttle member so that the shuttle member is allowed to start its carrying cycle and to move up from the standby level when there are no works on the jigs and when the movable base is above the slowdown point.

According to the invention, the controllers can check the position of the descending movable base at the slowdown point above the waiting position. Therefore, the lift controller starts to brake the movable base before it reaches the waiting position. Therefore, it is possible to prevent the inconvenience that both the lift and the shuttle conveyer reach the overlapping zone simultaneously and both of them are stopped their operation by the interlock control. In addition, the lift and the shuttle conveyer which are operating according to their own operation cycles can be separately and appropriately interlocked so as to prevent interference between them, and to convey the works smoothly.

DETAILED DESCRIPTION

Figure 1:
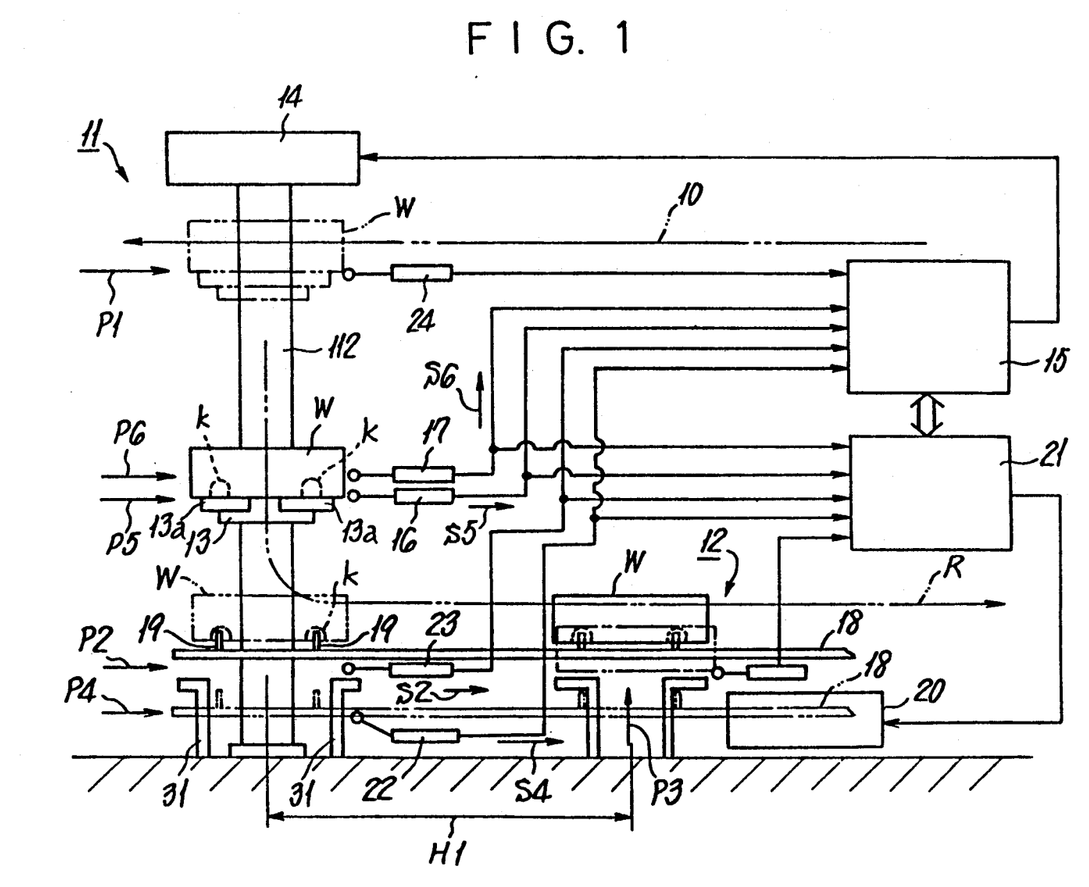
FIG. 1 is a schematic view of a conveying system embodying the present invention.
Figure 2:
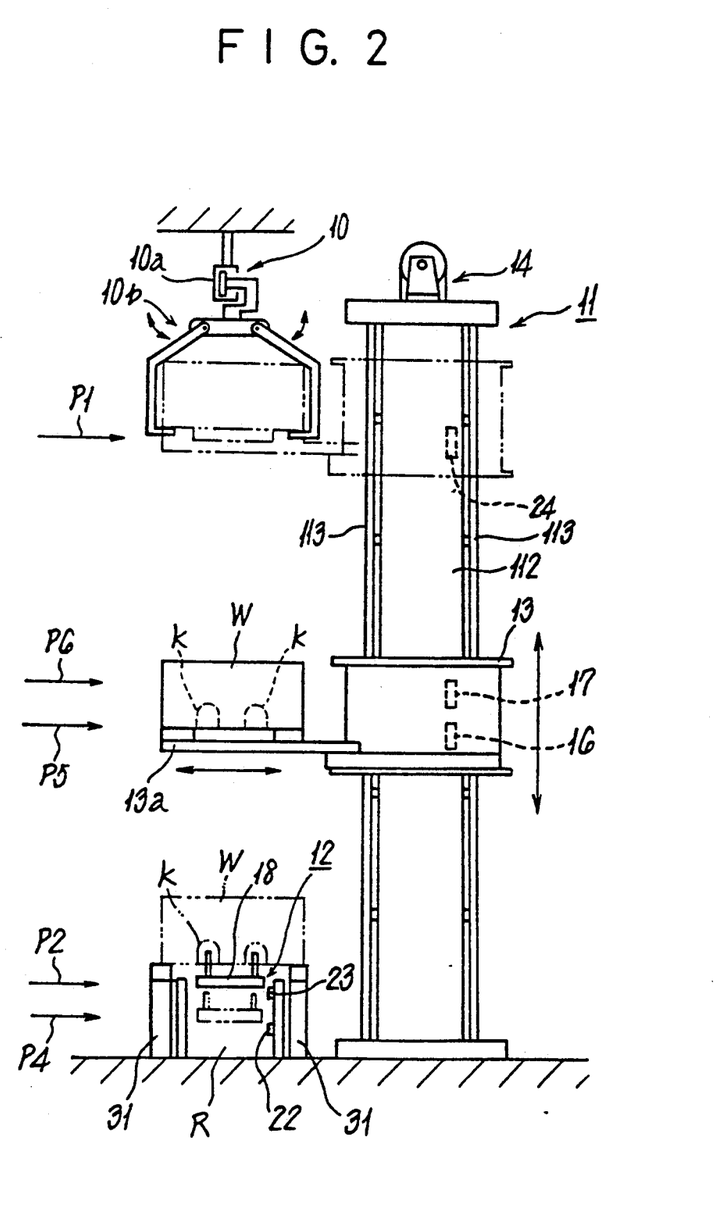
FIG. 2 is a schematic side cross-sectional view of a lift used for the conveyer system of FIG. 1, and partly shows a block diagram of an interlocking device.

A conveying system shown in FIGS. 1 and 2 is installed along a conveying route R in an automobile body assembly line.

Works W such as automobile body panels are carried by an overhead conveyer on a route 10 to a first delivery position P1, where each work W is loaded onto a lift 11. The lift 11 brings the work W down to a second lower delivery position P2, where the work is transferred onto a shuttle conveyer 12. Then, the shuttle conveyer 12 delivers the work W to a third delivery position, where the work W is processed at a first work station.

The overhead conveyer on the route 10 comprises a rail 10a installed on the ceiling of a factory building and a work carrying member 10b. The work W is carried by the carrying member 10b to the first delivery position P1 from a preceding processing line.

The lift 11 includes a support 112, a movable base 13, and a lift driver 14. The support 112 is fixedly secured on the floor at its one end, stands upright, and has a plurality of guide rails 113 formed thereon. The movable base 13 reciprocates on the guide rails 113 between the positions P1 and P2, i.e. receives the work at the first delivery position P1 and brings it down to the second delivery position P2. The movable base 13 has a retractile fork 13a, which projects horizontally from the movable base 13 so as to receive and carry the work W thereon. The fork 13a is retracted into the movable base 13 when the movable base 13 does not carry anything thereon, thereby preventing interference with another conveyer. The lift driver 14 is located on the top of the support 112, is connected to the movable base 13, and reciprocates the movable base 13. The operation of the lift 11 is controlled by a lift controller 15 electrically connected to the lift driver 14.

The lift controller 14 controls the operation of the lift 11, and is installed at the top of the support 112.

The shuttle conveyer 12 is installed on the floor at a position under the overhead route 10, and includes a shuttle member 18 (to be described later). The shuttle conveyer 12 conveys a number of works W simultaneously step by step between work stations which are positioned along the assembly line. Specifically, when carrying works W, the shuttle member 18 is moved upwardly by a drive mechanism (not shown) to pick up the works W on jigs 31 at the respective work stations, and laterally moves to a preset stroke to convey the works W while it remains upward. Then, the shuttle member 12 moves downwards to place the works W on the jigs 5 at the respective work stations, returns to its original position on a standby level P4 while keeping the low posture, and stops there. The shuttle conveyer 12 repeats the foregoing procedure.

The shuttle member 18 is driven by a shuttle driver 20, which is controlled by a shuttle controller 21 so as to operate according to the operation cycle of the work stations. The jigs 31 at the work stations are located outside the moving path of the shuttle member 18 so as not to interfere with the shuttle member 18.

First to third limit switches 24, 17 and 16 are positioned on the support 112 of the lift 11, and are selectively operated by the movable base 13. The first limit switch 24 is positioned at a height corresponding to the first delivery position P1, is turned on when the movable base 13 is at the first delivery position P1, and signals the lift controller 15 that the movable base 13 is at the first delivery position P1. The second limit switch 16 is at a height corresponding to a waiting position P5, which is between the first delivery position P1 and the second delivery position P2, and is somewhat nearer the second delivery position P2. The second limit switch 16 is turned on when the movable base 13 moves upwards from the second delivery position P2 and passes through the waiting position P5. On the other hand, when the movable base 13 moves downward from the first delivery position P1 and passes through the waiting position P5, the second limit switch 16 is turned off. Specifically, when the movable base 13 is above the waiting position P5, the second limit switch 16 is turned on and sends a signal S5(ON) to the lift controller 15 and the shuttle controller 21. When the movable base 3 is below the waiting position P5, the limit switch 16 is turned off, sending the signal S5 (OFF) to the lift controller 15 and shuttle controller 21, respectively.

The third limit switch 17 is located at a height corresponding to a slowdown point P6 which is above the waiting point P5 to a preset extent, i.e. above the second limit switch 16. The limit switch 17 operates in a manner similar to the second limit switch 16. When the movable base 13 is above the slowdown point P6, the third limit switch 17 is turned on, sending a signal S6(ON) to the lift controller 15 and the shuttle controller 21. On the other hand, when the movable base 13 is below the slowdown point P6, the limit switch 17 is turned off, sending the signal S6(OFF) to the lift and shuttle controllers 15 and 21, respectively.

As described above, the shuttle conveyer 12 includes the shuttle member 18, which is movable laterally and vertically, and is in the shape of frame. The shuttle member 18 moves up from the standby level P4 to the second delivery position P2, where it receives and holds a work W, and slides laterally one stroke H1 to reach a third delivery position P3. There, the shuttle member 18 places the work W on the jig 31, moves itself down to the preset extent, and returns to the original position on the standby level P4. The shuttle conveyer 12 repeats the foregoing conveying cycle, and is controlled to be actuated according to each preset operation cycle of the automobile assembly line.

The shuttle member 18 has a plurality of projecting guide pins 19 which are juxtaposed with spaces therebetween corresponding to the work stations. At the second delivery position P2, the work W is placed on the shuttle member 18 with its indentations k engaged with the guide pins 19, so that the work W can be reliably positioned on the shuttle member 18. Each time the shuttle member 18 is laterally moved to the stroke H1, the works W on the shuttle member 18 are fed to the succeeding processing positions.

The shuttle conveyer 12 is actuated by the known shuttle driver 20, which is then controlled by the shuttle controller 21. The shuttle conveyer 12 has a standby switch 22 to send a standby signal S4 when the shuttle member 18 is on the standby level P4. Furthermore, a work switch 23 is located at the second delivery position P2 so as to send a work signal S2 indicating the presence of the work W at the second delivery position P2.

The standby and work switches 22 and 23 are connected to the lift and shuttle controllers 15 and 21, respectively, to send the signals S4 and S2 to these controllers 15 and 21.

The lift and shuttle controllers 15 and 21 are microcomputers, respectively, and have communication lines so as to transfer the signals between them. Operation of the conveying system of the invention will be described hereinafter with reference to control programs shown in FIGS. 3 to 5.

Figure 3:
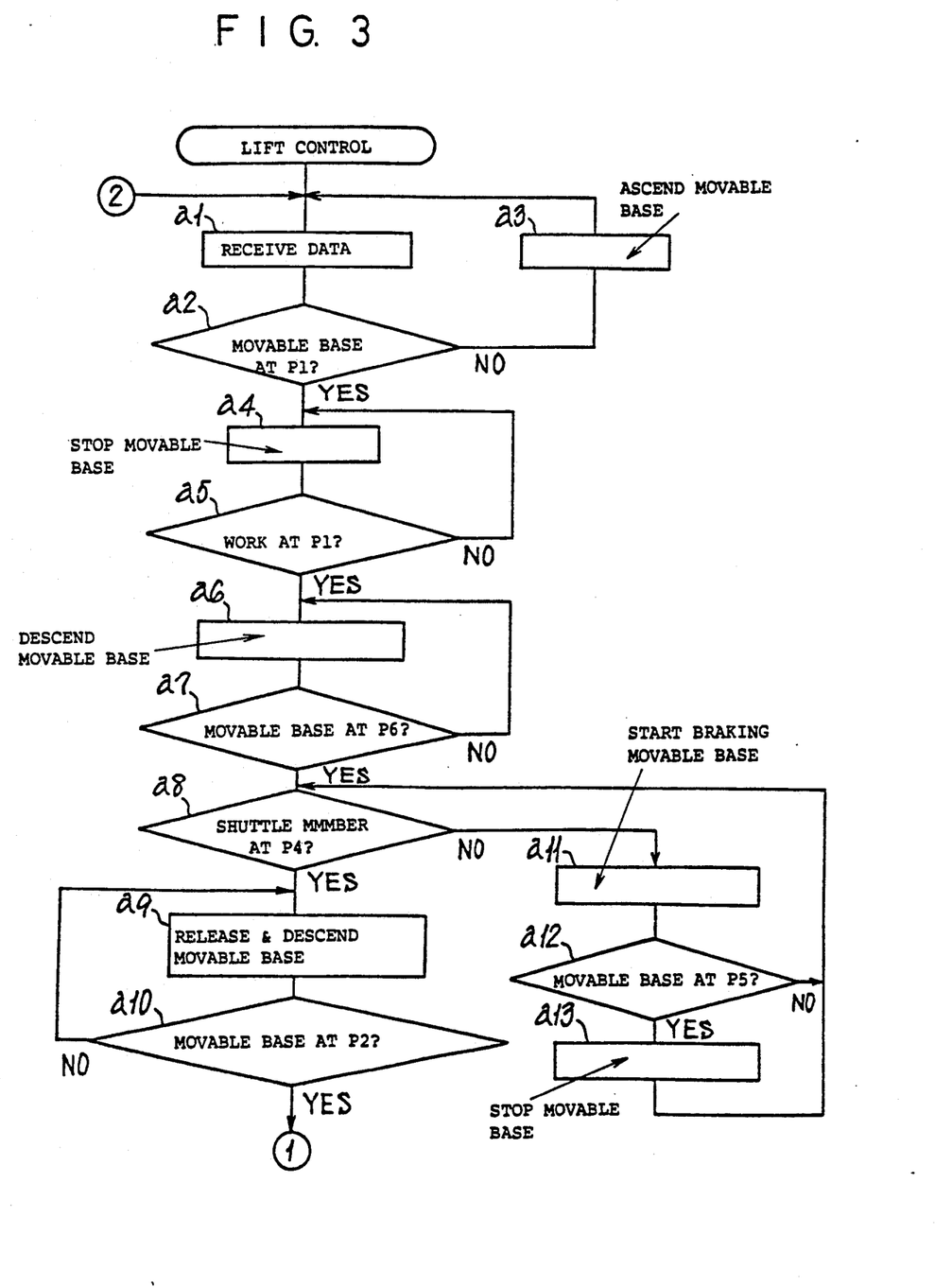
FIG. 3 is a first part of a flowchart showing a routine for controlling the lift used for the conveying system of FIG. 1.

When actuated, the lift controller 15 receives latest data. According to the signal from the first limit switch 24, the lift controller 15 checks whether or not the movable base 13 is at the first delivery position P1. When the movable base 13 is not, control goes to step a3 so as to move the movable base 13 upwardly. When the movable base 13 reaches the first delivery position P1, it is stopped and stays there with the fork 13a projecting horizontally until the work W is brought there by the carrying member 10b. When the lift controller 15 detects, in step a5, the arrival of the work W at the first delivery position P1 and loading of the work W on the fork 13a, the lift controller 15 causes the lift driver 14 to descend the movable base 13. In step a7, the lift controller 15 waits until the movable base 13 reaches the slowdown point P6. When the movable base 13 is found to have reached the slowdown point P6 according to the third limit switch 17, the controller 15 checks in step a8 whether or not the shuttle member 18 is on the standby level P4 according to the standby switch 22. When the shuttle member 18 is, the controller 15 advances to step a9. If the movable base 13 has been braked, it is released and made to move downwardly to arrive at the second delivery position P2.

Figure 4:
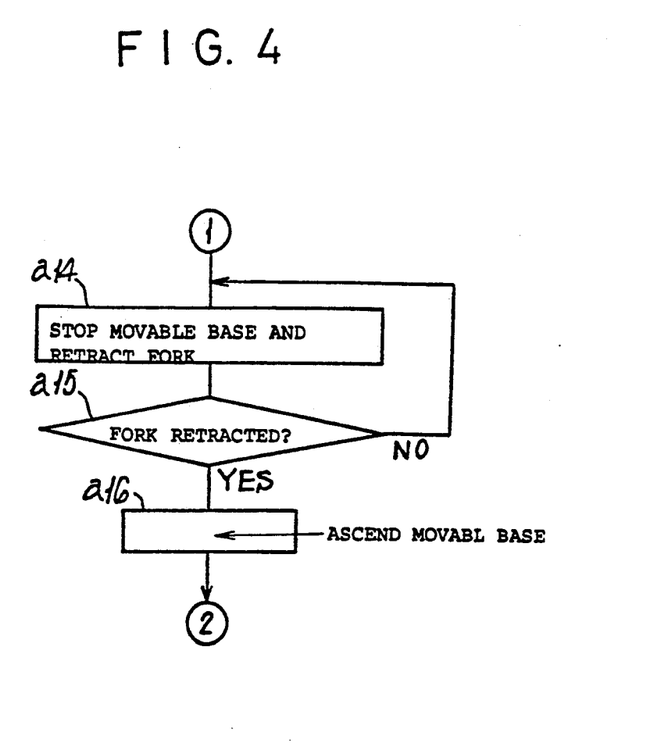
FIG. 4 is a second part of the flowchart of FIG. 3.

When the movable base 13 reaches the second delivery position P2, the controller 15 proceeds with step a14, where it stops the movable base 13, retracts the fork 13a, places the work W on the jig 31 with the indentations k positioned so as to be just above the guide pins 19 on the shuttle member 18.

In step a15, the lift controller 15 checks, according to a fork detecting switch, whether or not the fork 13a has been retracted. If the fork 13a has been retracted, control returns to the step a1.

When the shuttle member 18 is not found to be at the original position on the standby level P4 in step a8, control goes to step a11. Under this condition, the lift controller 15 starts to brake the movable base 13 which keeps moving down via the slowdown point P6. When the movable base 13 reaches the waiting position P5, the lift controller 15 stops the movable base 13 completely. Thereafter, the foregoing condition is maintained until the shuttle member 18 returns to the original position on the standby level P4. When the shuttle member 18 returns to the original position, control goes to step a10, where the lift controller 15 frees the movable base 13 to restart the downward movement of the movable base 13, and then control goes to step a10 and succeeding steps.

As described above, the lift 11 moves its movable base 13 down to the second delivery position P2 via the waiting position P5 only when the shuttle member 18 stays at the original position on the standby level P4. The lift 11 places the work W at the second delivery position P2, and immediately to ascend above the waiting position P5.

Figure 5:
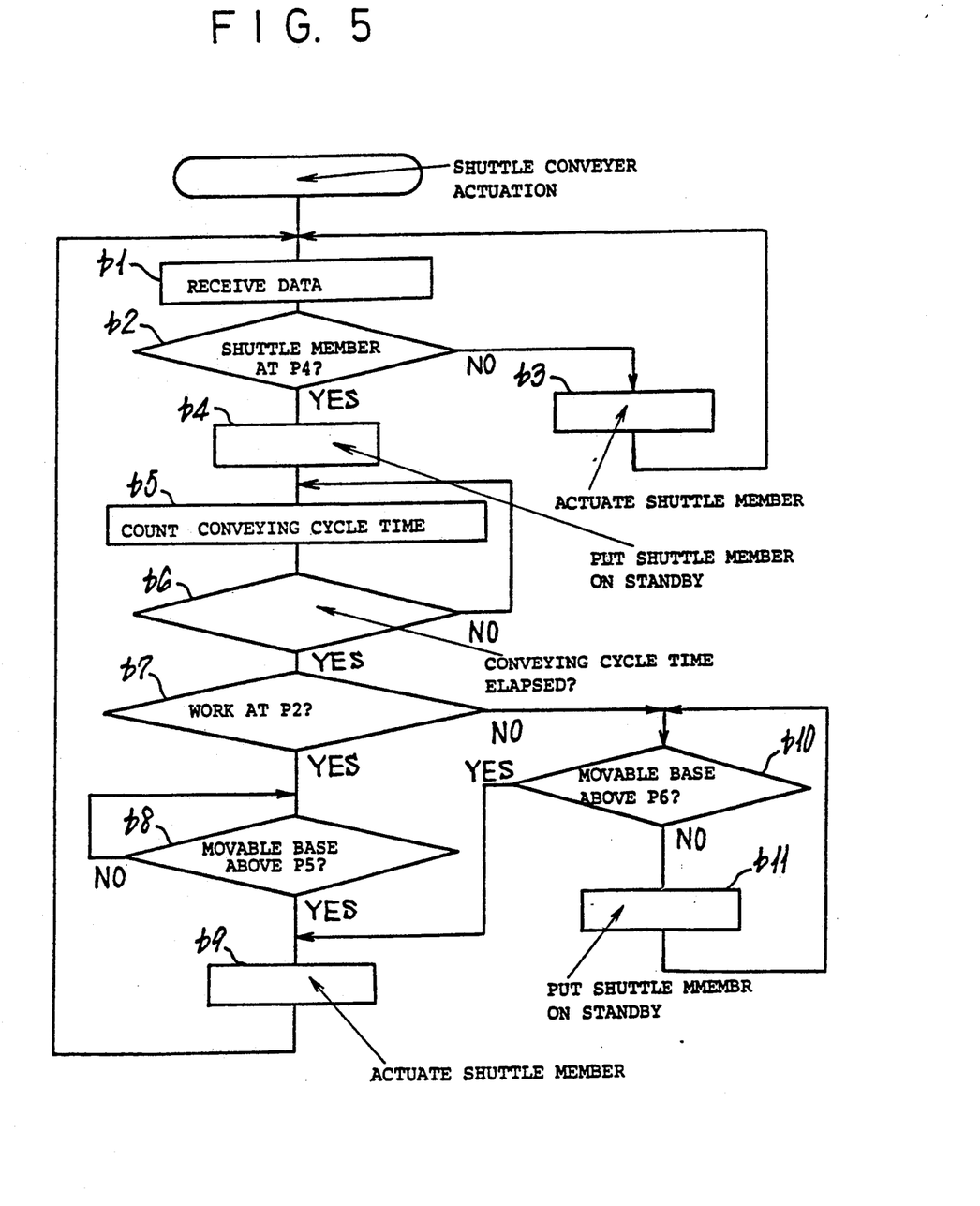
FIG. 5 is a flowchart showing a routine for controlling a shuttle conveyer used for the conveyer system of FIG. 1.

The shuttle controller 21 receives latest data, and checks, according to the standby switch 22, whether or not the shuttle member 18 is on the standby level P4. Then, the shuttle controller 21 makes the shuttle member 18 return to the original position on the standby level P4.

When the shuttle member 18 reaches the original position on the standby level P4, the shuttle controller 21 puts the shuttle member 18 in the standby state in step b4, and immediately starts to count the conveying cycle time. When counting of the conveying cycle time is completed, control goes to the step b7. The shuttle controller 21 checks, according to the work signal S2 from the work switch 23, whether or not the work W is at the second delivery position P2. If the work W is, the shuttle controller 21 checks in step b8 if the movable base 13 is above the waiting position P5, according to the signal S5 from the second limit switch 16. When the movable base 13 reaches a position above the waiting position P5, the shuttle controller 21 actuates the shuttle member 18, and returns to step b1.

The shuttle member 18 moves up to engage the guide pins 19 with the indentations k of the work W. Under this condition, the works W (not shown) at the respective work stations are also engaged with the guide pins via their indentations k. Then, the shuttle member 18 moves laterally to the stroke H1, and transfers the received work W to the third delivery position P3. Under this condition, the other works W on the shuttle member 18 are also moved laterally to succeeding work stations. After moving to the stroke H1, the shuttle member 18 descends to the standby level P4 and returns to the original position.

In step b7, when the work W is not found to be at the second delivery position P2, control goes to step b10. In step b10, whether or not the shuttle member 18 can start upward movement is checked according to an output of the third limit switch 17. When the limit switch 17 is on, the movable base 13 is considered to be above the slowdown point P6. Then control goes to step b9 so as to actuate the shuttle member 18. On the contrary, when the limit switch 17 is off, it is turned on by the movable base 13 which is at the slowdown point P6. The shuttle controller 21 judges that the movable base 13 has reached the slowdown point P6, descending the movable base 13 preferentially, and stop the shuttle member 18 on the standby level P4. Thus, the shuttle member 18 is put on the standby condition.

The shuttle conveyer is actuated when there is no work W at the second delivery position P2 and when the movable base 13 is not below the slowdown point P6. In addition, the shuttle conveyer is actuated when there is the work W at the second delivery position P2 and when the movable base 13 is moving above the waiting position P5.

Both the lift and shuttle controllers 15 and 21 cooperate so as to reliably prevent the interference between the movable base 13 and the shuttle member 18. Specifically, the lift controller 15 interrupts the downward movement of the movable base 13 when the movable base 13 reaches the slowdown point P6 above the waiting position P5, thereby stopping the latter at the waiting position P5 without fail. Therefore, the shuttle member 18 and the movable base 13 cannot reach the second delivery position P2 at the same time. In addition, the movable base 13 and the shuttle member 18 are not subject to the interlock control simultaneously, which means these devices never become inoperative at the same time.

In the foregoing embodiment, although microcomputers are used as both the lift controller 15 and shuttle controller 21, they may be of sequencers which include input-output circuits having contacts, and control circuits able to receive signals to and from the input-output circuits.

Interlocking control is executed when the movable base 13 moves down passing through the slowdown point P6 before the shuttle member 18 is not at the original position on the standby level P4 is, so that the movable base 13 is caused to be stopped by the lift controller 18.

On the other hand, the interlocking control is applied to the shuttle member 18 so that the shuttle member 18 is allowed to start its carrying cycle and to move up from the standby level when there are no works on the jigs and when the movable base is above the slowdown point.

According to the invention, the controllers can check the position of the descending movable base at the slowdown point above the waiting position. Therefore, the lift controller starts to brake the movable base before it reaches the waiting position. Therefore, it is possible to prevent the inconvenience that both the lift and the shuttle conveyer reach the overlapping zone simultaneously and both of them are stopped their operation by the interlock control. In addition, the lift and the shuttle conveyer which are operating according to their own operation cycles can be separately and appropriately interlocked so as to prevent interference between them, and to convey the works smoothly.

What is claimed is:

1. A conveying system for conveying works between an upper conveyer and a lower conveyer, comprising:
   (a) said upper conveyer for conveying the works, including work carrying members and moved along an upper conveying route;
   (b) a lift for bringing the works between said upper conveyer and said lower conveyer, and including a movable base for placing the works thereon and a lift driver for driving said movable base;
   (c) a plurality of jigs for supporting the works and juxtapsed with preset spaces therebetween along said lower conveyer;
   (d) said lower conveyer for conveying the works and including
   (d-1) a shuttle member which is vertically reciprocative between an upper level for receiving and delivering the works from and to said jigs and a lower level after delivery of the works, and is laterally reciprocative to a preset stroke from an original position, and
   (d-2) said shuttle driver which vertically reciprocates said shuttle member between the upper and lower levels, and laterally reciprocates said shuttle member to the preset stroke from and to the original position according to a conveying cycle;
   (e) a first detecting means for detecting whether or not said movable base of said lift is at a position to receive the work from said upper conveyer;
   (f) a second detecting means for detecting whether or not said movable base of said lift is above a waiting position on a moving path of said movable base;
   (g) a third detecting means for detecting whether or not said movable base of said lift is above a slowdown point between said upper conveyer and the waiting position;
   (h) a work detecting means for detecting whether or not works are on said jigs, and located near said jigs;
   (i) a standby level detecting means for detecting whether or not said shuttle member is at the standby level, and located on an immovable member of said shuttle conveyer;
   (j) a lift controller for providing said lift driver with a control signal to ascend said movable base in response to a signal from said first detecting means indicating that said movable base is not at an upper first delivery position, and for sending said lift driver a signal to brake and stop said movable base in response to a signal indicating that said shuttle member is not on the standby level when said movable base is moving downwardly from an upper position via the slowdown point and the waiting position;
   (k) a shuttle controller for operating said shuttle member repeatedly at each conveying cycle, and initiating the conveying cycle of said shuttle member by providing said shuttle driver with a signal for allowing the upward movement of said shuttle member only in response to a signal from said work detecting means indicating that no works are placed on said jigs, in response to a signal from said second detecting means indicating that said movable base is above the waiting position, and in response to a signal from said third detecting means indicating that said movable base is above the slowdown point.

2. A conveying system according to claim 1, wherein
(a) said movable base of said lift is installed on an upright support so as to be vertically reciprocative thereon,
(b) said second detecting means is a limit switch which is turned on by said movable base when said movable base moves upwardly from a lower position via the waiting position, and is turned off by said movable base when said movable moves downwardly via the waiting position, and
(c) said third detecting means is a limit switch which is turned on by said movable base when said movable base moves up from a lower position via the slowdown point, and is turned off by said movable base when said movable base moves down from an upper position via the slowdown point.

3. A conveying system according to claim 1, wherein said work detecting means is a limit switch which is turned on and off by the works supported on said jigs, and said standby level detecting means is a limit switch which is turned on and off by said shuttle member.

4. A conveyer system according to claim 1, wherein said movable base includes a base body movably supported on said support of said lift and a work holding means which projects to hold the work thereon and is retracted into said base body so as not to interfere with said shuttle member when said holding means is not in use.

* * * * *